G. B. KOHLER.
FARE BOX.
APPLICATION FILED FEB. 28, 1910.

1,068,783.

Patented July 29, 1913.
5 SHEETS—SHEET 1.

Witnesses.

Inventor—
George B. Kohler
by his Attorneys.

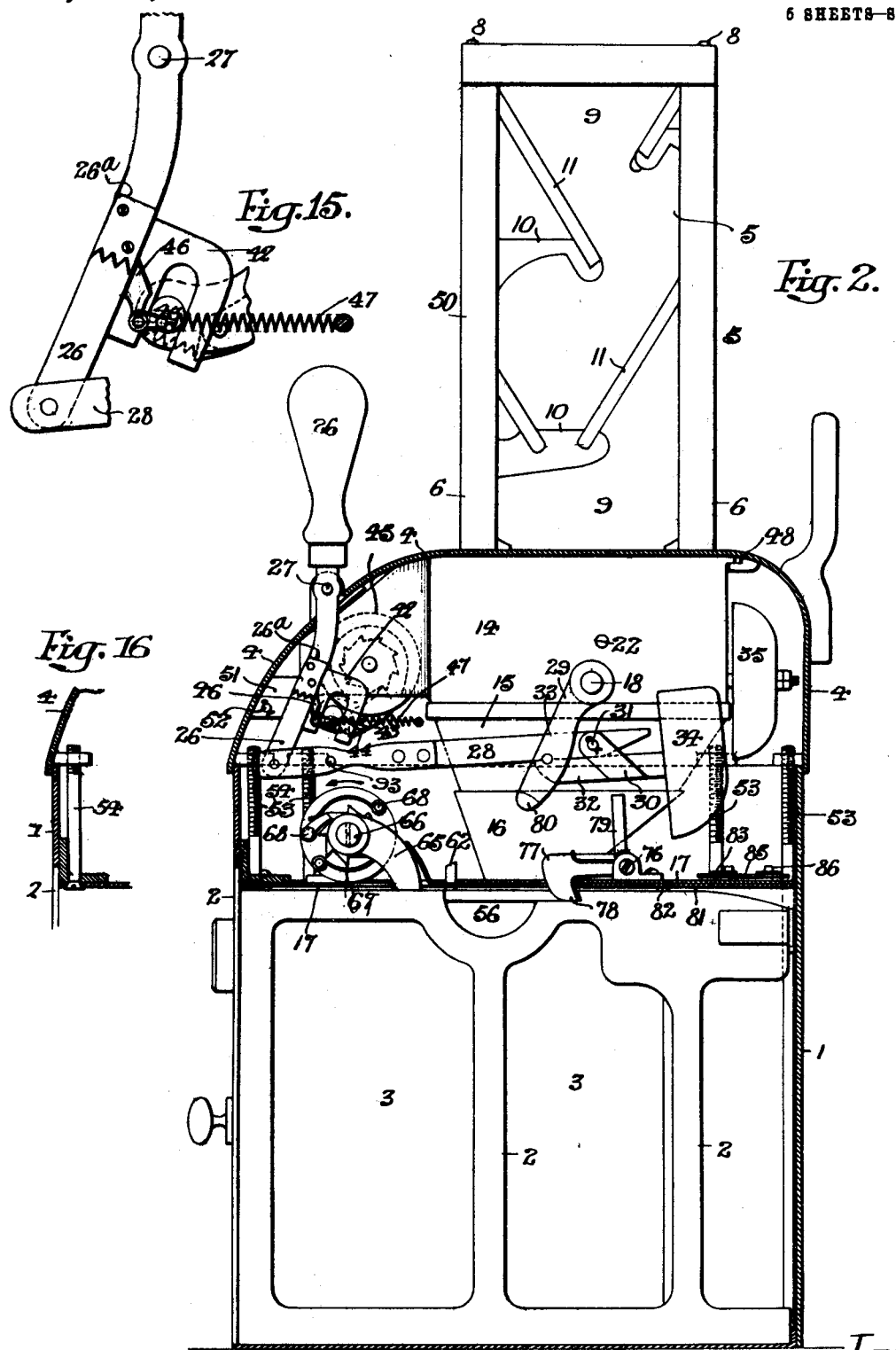

G. B. KOHLER.
FARE BOX.
APPLICATION FILED FEB. 28, 1910.

1,068,783.

Patented July 29, 1913.
5 SHEETS—SHEET 3.

Witnesses
Titus N. Imms
Willis H. Burrows

Inventor
George B. Kohler
by his Attorneys
Howson & Howson

G. B. KOHLER.
FARE BOX.
APPLICATION FILED FEB. 28, 1910.
1,068,783.
Patented July 29, 1913.
5 SHEETS—SHEET 4.
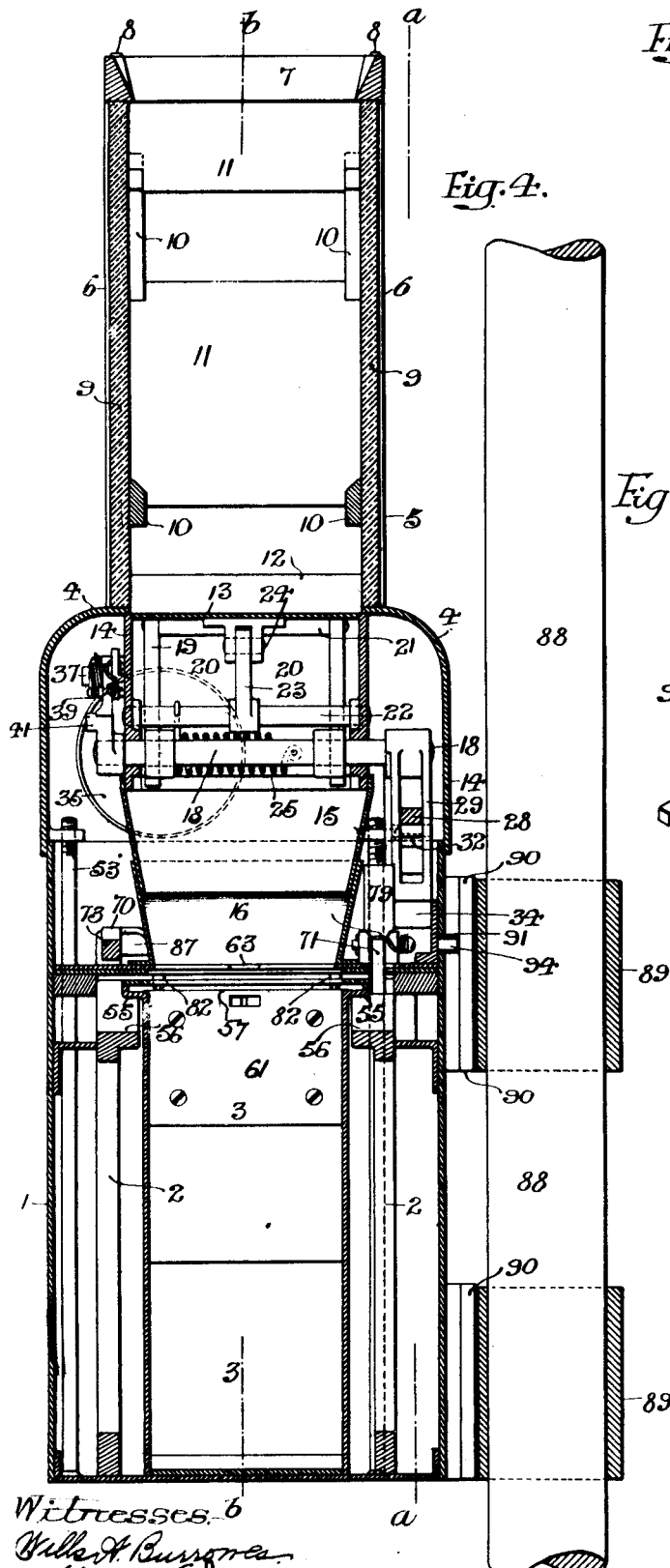
Fig. 4.
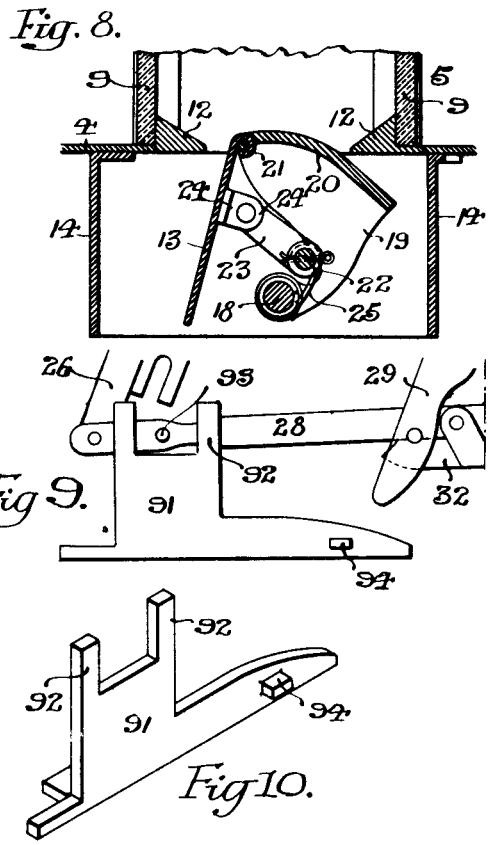
Fig. 8.
Fig. 9.
Fig. 10.
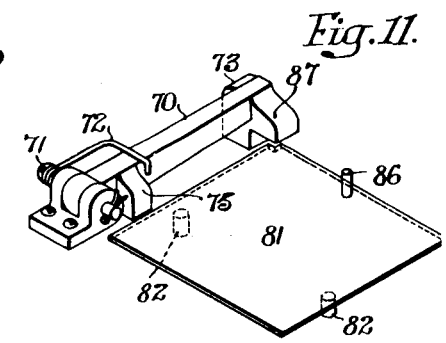
Fig. 11.
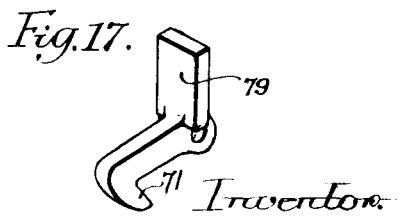
Fig. 17.
Witnesses
Inventor
George B. Kohler,
by his Attorneys

G. B. KOHLER.
FARE BOX.
APPLICATION FILED FEB. 28, 1910.

1,068,783.

Patented July 29, 1913.
5 SHEETS—SHEET 5.

Witnesses.

Inventor-
George B. Kohler
by his Attorneys.

UNITED STATES PATENT OFFICE.

GEORGE B. KOHLER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

FARE-BOX.

1,068,783.  Specification of Letters Patent.  Patented July 29, 1913.

Application filed February 28, 1910. Serial No. 546,371.

*To all whom it may concern:*

Be it known that I, GEORGE B. KOHLER, a citizen of the United States, residing in Philadelphia, Pennsylvania, have invented certain Improvements in Fare-Boxes, of which the following is a specification.

My invention relates to certain improvements in fare boxes used particularly in passenger cars for collecting fares from passengers as they enter the car, but it will be understood that my invention can be used for collecting money or tickets of admission in general.

One object of my invention is to construct a fare box with which no one can readily tamper.

Another object is to provide means for locking the fare box to the rail or other support, so that when said means is unlocked the fare box can be bodily removed from its support.

The invention relates also to certain details of construction which will be described hereafter.

Figure 12:
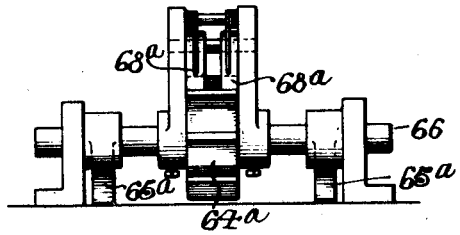
Figure 13:
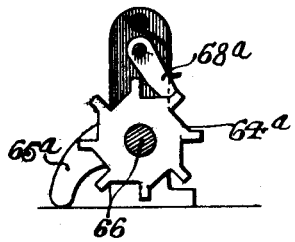
Figure 1:
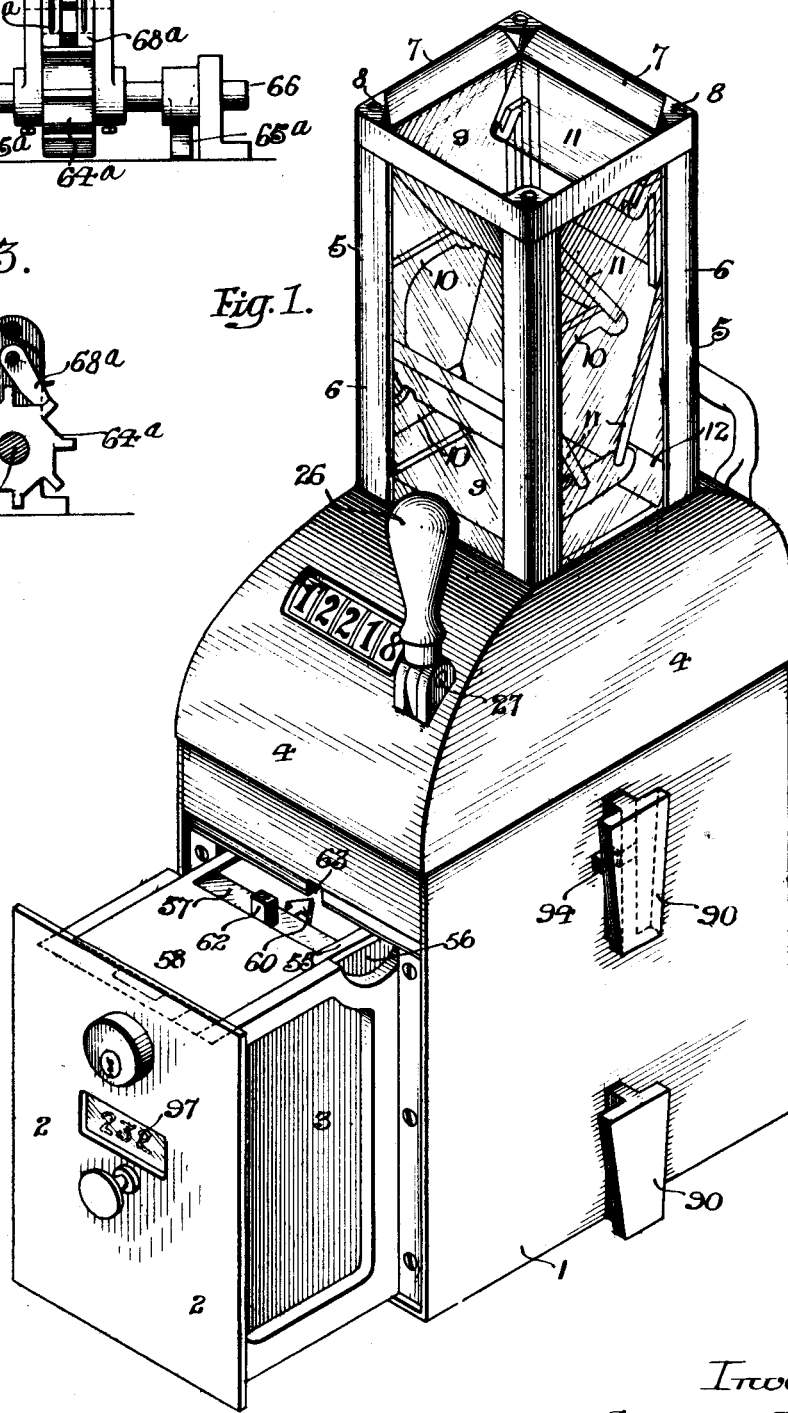
Figures 3, 14:
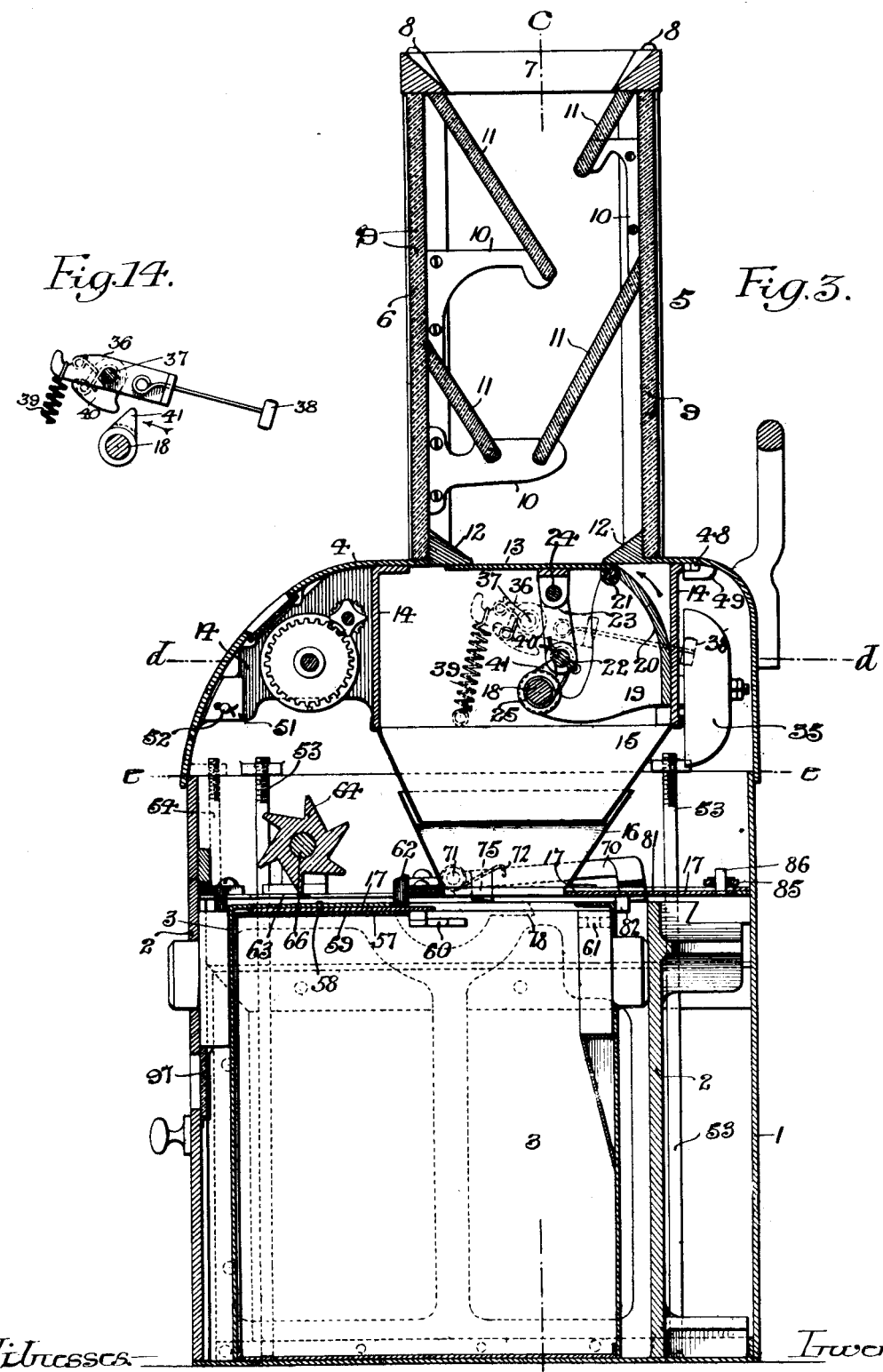
Figure 5:
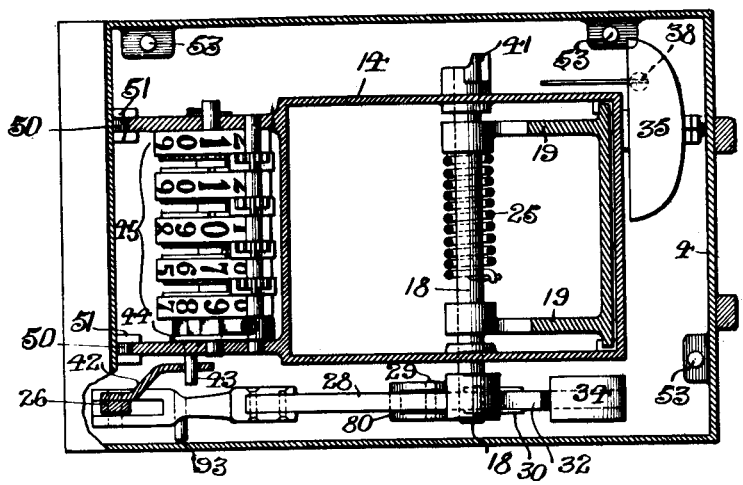
Figure 7:
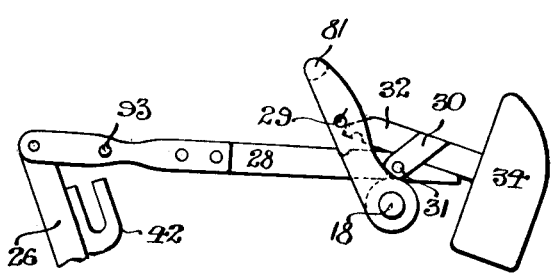
Figure 18:
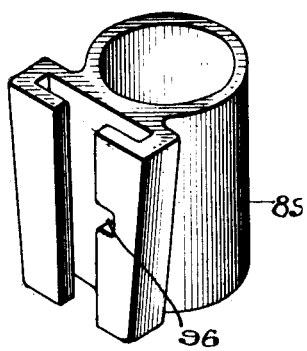
Figure 6:
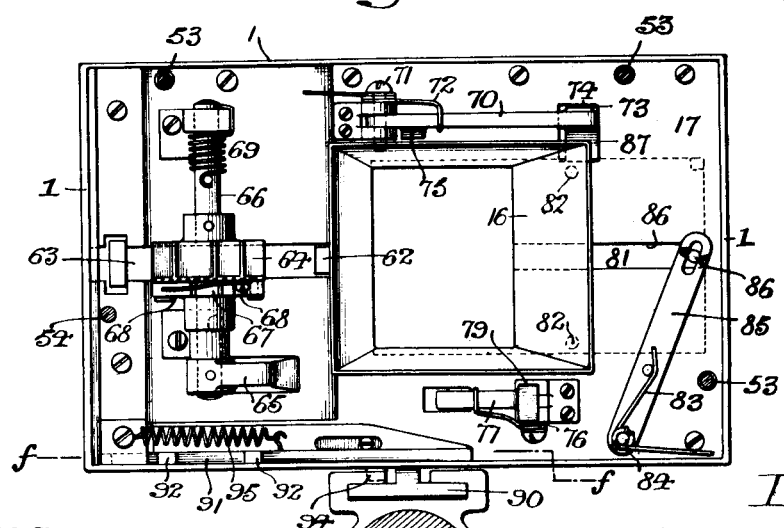

In the accompanying drawings:—Figure 1, is a perspective view of my improved fare box; Fig. 2, is a sectional elevation on the line *a—a*, Fig. 4; Fig. 3, is a sectional elevation on the line *b—b*, Fig. 4; Fig. 4, is a vertical sectional view on the line *c—c*, Fig. 3; Fig. 5, is a sectional plan view on the line *d—d*, Fig. 3; Fig. 6, is a sectional plan view on the line *e—e*, Fig. 3; Fig. 7, is a detail view showing the connecting rod between the discharge device and the operating handle in the inverted position; Fig. 8, is a sectional view of a portion of Fig. 3, showing the discharge device in position to discharge fares into the body of the box; Fig. 9, is a view on the line *f—f*, Fig. 6, showing the relation of the sliding bolt and connecting rod; Fig. 10, is a detached perspective view of the locking bolt; Fig. 11, is a perspective view of the valve at the lower end of the hopper which directs the fare into the fare receptacle; Figs. 12 and 13, are views illustrating a modification of the means for closing the cover of the fare receptacle; Fig. 14, is a detached view of the bell clapper; Fig. 15, is an enlarged view showing the detent pawl for the operating lever; Fig. 16, is a detached sectional view showing the short bolt for securing the cap section to the body of the box; Fig. 17, is a detached perspective view of the drawer retaining lever; and Fig. 18, is a detached perspective view of one of the sockets.

1 is the body of the fare box.

2 is the drawer containing the fare receptacle 3, which can be detached from the drawer when the drawer is moved out to its full extent.

4 is a cap section for the fare box and 5 is the fare receiving section which is mounted on the cap section.

The fare receiving section 5 consists of an open metallic frame having standards 6 at the corners and a quadrangular cap 7 open at the center and beveled, as shown. Tie rods 8 extend through the cap and through the standards and are screwed into the cap section 4 of the box. Plates of glass 9 are mounted between the standards on all four sides of the fare receiving section and brackets 10 are secured to the standards and are notched to receive the glass deflecting plates 11; the plates being cut away at each end to receive the hooked portions of the brackets. The plates extend from one side of the receiving section to the other, and the brackets are so formed as not to interfere with the free passage of the coin or other fare through the fare receiving section.

At the bottom of the fare receiving section are inclines 12 which, in the present instance, form part of the shell of the cap section 4, and these inclines direct the fare onto the plate 13 which closes the opening into the fare box proper. Within the cap section is a frame 14 to which is attached a funnel section 15 connecting with a funnel section 16 carried by a transverse partition 17 within the main body portion of the fare box, so that the fare discharged from the plate 13 will be directed to and through the opening in the partition 17 and into the fare receptacle 3.

Mounted in bearings in the frame 14 is a shaft 18 and on this shaft are mounted the arms 19 of a curved plate 20. The discharge plate 13 is pivoted at 21 to the curved plate 20, as shown.

22 is a rock shaft having an arm 23 attached to a lug 24 secured to the bottom of the plate 13 some distance from the pivot 12.

Coiled on the shaft 18 is a spring 25, one end of which is attached to the shaft 18; the other end being attached to the rock shaft 22, in the present instance. This spring returns the shaft to its normal position.

On the turning of the shaft 18 the curved plate 20 will move in the direction of its arrow, Fig. 3. The discharge plate 13 will be moved forward and its free end will be moved toward the shaft 18, as illustrated in Fig. 8, discharging any fare, either a coin or a ticket, from the fare receiving section 5 into the interior of the fare box.

26 is a hand lever pivoted to the cap section at 27. This lever passes through a slot in the cap section and is connected by a rod 28 to an arm 29 secured to the shaft 18, so that when the handle of the lever 26 is grasped by the conductor and the lever moved, the shaft 18 will be turned, causing the plate 13 to discharge the fare into the body portion of the box.

I may connect the rod 28 rigidly with the arm 29, but I prefer to make a connection which will be broken when the box is inverted to disconnect the hand lever from the discharge plate, so that, even if the box is inverted, the fare cannot be extracted from the fare box, as there is no means of dropping the discharge plate 13. One form of mechanism for accomplishing this purpose is shown in Figs. 2 and 7, in which a weighted lever 30 is pivoted at 31 to the rod 28. One arm 32 of the lever is notched to receive the pin 33 of the arm 29 and the rod 28 is also notched to receive said pin. The weight 34 of the lever is sufficient to hold the arm 32 against the rod 28, when in the proper position, as illustrated in Fig. 2, so that the lever 26 can operate the shaft 18 through said rod, but, if the box is inverted, the parts will assume the position shown in Fig. 7, as the weight 34 will cause the lever 30 to turn on its pivot 31, allowing the rod 28 to drop free of the pin 33 so that the connection between the lever 26 and the arm 29 will be broken and the movement of the lever will not be imparted to the arm of the discharge plate.

In order that an audible alarm will indicate each movement of the discharge plate, I secure a bell 35 on a suitable stud projecting from the frame 14 and pivot a lever 36 on a stud 37 carried by the frame 14. On one arm of this lever is a clapper 38 and attached to the other arm is a spring 39.

40 is a spring dog which is actuated by an arm 41 on the shaft 18, Fig. 14.

Secured to, or forming part of the arm 26 is a slotted projection 42, which engages a pin 43 on a lever 44 which actuates the register mechanism. This register mechanism is indicated at 45 and consists of a series of disks with gearing and ratchet mechanism and may be of any of the ordinary types of disk registers. Each disk is numbered 0 to 9 and when 0 is registered the adjoining disk is turned one point. This register is mounted in bearings in the frame 14.

On the lever 26 is a lug 26ª having ratchet teeth which engage a detent pawl 46 pivoted to the casing 4 and connected to the pawl is a spring 47, also attached to the casing 4, Fig. 15. The object of this pawl and ratchet construction is to make it impossible for the operator to move the lever part way in either direction; the pawl preventing the return of the lever until the lever is moved to the full extent. This construction forms no part of my present invention.

The frame 14, with all the mechanism, can be readily detached from the casing 4 in the event of repairs being necessary. On one end of the frame 14 are lugs 48 which engage lips 49 on the casing 4 and on the other end of the frame are lugs 50, which enter slots in projections 51. Pins 52 are used to fasten the lugs to the projections and, on the withdrawal of the pins 52, the frame can be turned and withdrawn from under the lips 49; being readily detached from the cap section after the cap section has been removed from the body portion. The cap section, in the present instance is secured to the body portion by vertical bolts 53, which are screwed into lugs on the cap section and extend up through the underside of the box. A short bolt 54 passes through an opening in the plate 17 and through lugs on the cap section 4, Figs. 2 and 16, so that this bolt cannot be removed without withdrawing the drawer 2 and detaching the fare receptacle 3. Therefore, even if the bolts 53 were removed the cap section could not be detached from the body 1, without first removing the bolt 54.

Within the drawer 2 is the fare receptacle 3. This fare receptacle is flanged at 55 and the drawer is notched at 56, so that a person can grasp the fare receptacle at the flange and remove it from the drawer. The fare receptacle has a sliding cover 57 adapted to slide between the top plate 58 and a bottom plate 59, Fig. 3, and has an arrow pointed tongue 60 which engages the bolt of a lock 61 on the body of the fare receptacle.

62 is a lug projecting from the sliding cover plate 57 and when the receptacle is placed in the drawer and the drawer closed this lug 62 travels in a slot 63 in the partition 17 and comes in contact with the end wall of the slot, causing the cover plate 57 to stop. When the drawer is moved in to its full extent the opening in the fare receptacle 3 will be directly under the opening in the hopper 16. When the drawer is pulled out, then the lug 62 travels until it comes in contact with a toothed wheel 64 loose on a shaft 66 which is prevented from rotating by a dog 65 on the end of the shaft 66 and holds the cover plate 57 until the inner end of the receptacle reaches the dog 65. The dog will then drop back of the receptacle and the wheel will be free to rotate, allowing the lug 62 to pass. In the meantime, the cover plate 57 closes the opening in the receptacle and the tongue 60 is engaged by the bolt of the lock 61.

The lock, in the present instance, is a key lock and the receptacle cannot be opened until the proper key is inserted. The receptacle, when removed from the fare box, is taken to the office of the company and there opened; insuring the proper transfer of the fares from the box to the person whose duty it is to count the fares.

When the drawer is partly closed, the passage of an instrument through the slot 63 will be prevented by the toothed wheels 64, as such instrument would strike one tooth of the wheel, causing the wheel to revolve until stopped by the following tooth coming in contact with the instrument; preventing further movement of the instrument. The wheel is allowed to rotate in one direction and locked from rotation in the opposite direction by a pawl and ratchet mechanism, as shown clearly in Fig. 2. The ratchet wheel 67 is secured on the shaft 66 and the two pawls 68 are pivoted to the wheel 64; being held in contact with the ratchet wheel by springs, as shown, so that the wheel 64 is free to rotate in the direction of the arrow, Fig. 2, but is locked against rotation in the opposite direction by the pawls engaging the fixed ratchet wheel 67. As soon as the arm 65 falls back of the fare receptacle, when the drawer is open to the full extent, then the shaft 66 is allowed to turn, together with the wheel 64, a given distance, and the lug 62 on the cover can then pass the wheel. A spring 69, having one end secured to the shaft 66 and the other end secured to a bearing on the plate 17, will force the dog 65 to move back of the fare receptacle as soon as the said receptacle passes it.

In some instances, I may use the construction illustrated in Figs. 12 and 13, in which the shaft 66 has two dogs 65ª secured to it, and a toothed wheel 64ª, which is also the ratchet. The pawls 68ª are carried by arms secured to the said shaft. This construction does away with the ratchet wheel and the pawl can be made more substantial.

In order to prevent the closing of the drawer when the fare receptacle is not in position, I provide an arm 70 pivoted at 71 to the partition 17 and provided with a spring 72 which tends to force it down, Fig. 11. On the free end of the arm 70 is a projection 73, which passes through a slot 74 in the partition 17 and into the path of the drawer. On the arm is a projection 75, which also extends through a slot in the partition 17 and into the path of the fare receptacle, so that when the fare receptacle is in the drawer it raises the arm 70 by contacting with the projection 75 and allows the drawer to be moved in to its full extent; but, if the fare receptacle is not in position, the projection 73 is in the path of the drawer and the drawer strikes this projection so that it is impossible for any one to close the drawer unless the fare receptacle is in position.

Pivoted to bearings 76 on the partition 17 is a two-arm lever 77, Figs. 2 and 17. One arm of the lever is hooked and passes through an opening in the partition 17 so as to engage a notch 78 in the rim of the drawer, preventing the opening of the drawer until the lever 77 is raised. The arm 79 of the lever extends in the path of the arm 29 carried by the shaft 18; the end 80 of this arm strikes the arm 79 and turns the lever 77 on its pivot when the hand lever 26 is operated to actuate the discharge plate, allowing the fare to enter the box, so that it is impossible to open the drawer until the operating lever 26 is moved, insuring the discharging of all fares into the fare receptacle, and the operating lever is retained in position so as to hold the lever 77 clear of the drawer, and while the lever is so held the drawer can be readily removed when unlocked.

81 is a sliding plate adapted to close the opening in the partition 17 leading from the hopper 16, when the drawer is opened. This plate has two pins 82 in the present instance, which are engaged by the fare receptacle 3, carried by the drawer 2, so that when the drawer, with the receptacle, is pushed in, the plate is pushed back against the pressure of the spring 83, which is mounted on a pivot 84 and bears against a stud on a lever 85, Fig. 6. This lever is slotted at its outer end and a pin 86 on the plate 81 extends through the slot, as clearly shown in Fig. 6. As soon as the drawer is opened the plate will immediately close the opening. In order to lock the plate 81 in its closed position when the drawer is open, I so form the projection 73 on the lever 70 that the portion 87 will rest back of the plate. The projection clears the plate when the lever 70 is raised by the receptacle 3 coming in contact with it.

The fare box, in the present instance, is mounted on a standard 88 having sockets 89, Fig. 18, and these sockets are shaped to receive the T-headed projections 90 on the side of the body portion 1 of the fare box, Fig. 1. These projections are also tapered, so that when in place they fit snugly in the sockets and hold the fare box rigidly to the standards. In order to prevent the removal of the farebox from the standard without first moving the operating lever 26, I provide a sliding bolt 91, shown clearly in Figs. 9 and 10, which has arms 92 between which extends a pin 93 on the connecting rod 28, Fig. 9. This bolt has a lateral projection 94 which extends through the casing of the fare box and is adapted to enter a notch 96 in one of the sockets 89, Fig. 18. A spring 95 tends to hold the bolt in the notch in the socket, but when the hand lever 26 is moved it pushes the bolt forward and consequently the projection 94 is moved out of the notch 96 of the socket 89, whereupon the box is free to be raised and detached from the standard. The bolt may be modified without departing from the essential features of the invention, which is to lock the box to the standard so that it cannot be detached without first operating the hand lever, thus insuring the discharge of the fares into the fare box before the box is detached from its support.

It will be noticed upon referring to Fig. 1, that there is a glazed opening 97 in the front of the drawer and each fare receptacle is numbered. When the fare receptacle is in position in the drawer the number is exposed through the glazed opening.

In operating my improved fare box, the fares are placed within the fare receiving section and dropped onto the platform. The hand lever is actuated, simultaneously discharging the fare into the body of the box, registering it and striking the bell. The fare passes directly into the fare receptacle in the drawer. At the end of the trip the drawer is opened by the proper person after it is released by holding the hand lever in position, and as the drawer is opened the cover of the fare receptacle is closed and locked. By holding the hand lever any fares that may be placed in the fare receiving section are discharged into the fare receptacle before the drawer is opened. Simultaneously with the closing of the cover of the fare receptacle the slide closes the opening in the hopper, and in the transverse partition, so that any fares inserted in the fare receiving section, after the drawer is opened, are deposited in the hopper and remain there until the fare receptacle is placed in position and opened. In placing the empty fare receptacle in the drawer the cover is in the open position and its projection will readily pass the toothed wheel, as the wheel is free to turn as the drawer is pushed in, but, if the receptacle is not in position in the drawer, the drawer cannot be entirely closed, as it will come in contact with the lug on the lever. When the fare receptacle, however, is in the drawer it will contact with the same lever at another point and lift it clear of the drawer so that the drawer can be closed and locked.

The construction and operation of the mechanism connected with the fare receptacle of the fare box forms the subject of a separate application, filed April 14, 1911, Serial No. 621,003.

I claim:

1. The combination of a fare box having a discharge device for the fares; a support for the box; a lock for securing the box to the support; and an operating means extending outside of the box and connected to the lock and to the discharge device so that the discharge device must be actuated before the box can be removed from the support.

2. The combination of a fare box having a discharge device for the fares; a notched support for the box; a sliding bolt located within the box and having a projection arranged to enter the notch in the support; a spring tending to hold the projection in the notch; a hand lever on the outside of the box and connected to the discharge device and arranged to actuate the bolt to release the box from the support.

3. The combination of a fare box having a receiving section and a fare receptacle, a discharge means between the receiving section and the receptacle, a vertical support, two undercut sockets on the support, T-headed projections on the box fitting the sockets, and a lock on the box actuated by the discharge means and arranged to engage one of the sockets.

In testimony whereof, I have signed my name to this specification, in the presence of two subscribing witnesses.

GEORGE B. KOHLER.

Witnesses:
Wm. E. Shupe,
Wm. A. Barr.